(12) United States Patent
Liu

(10) Patent No.: US 9,140,531 B2
(45) Date of Patent: Sep. 22, 2015

(54) DETECTING GAUGE WITH HIGH ACCURACY

(71) Applicant: SHENG KUO MACHINERY CO., LTD., Kaohsiung (TW)

(72) Inventor: Kuo-Sheng Liu, Kaohsiung (TW)

(73) Assignee: Sheng Kuo Machinery Co., Ltd., Kaohsiung (TW)

( * ) Notice: Subject to any disclaimer, the term of this patent is extended or adjusted under 35 U.S.C. 154(b) by 128 days.

(21) Appl. No.: 14/103,049

(22) Filed: Dec. 11, 2013

(65) Prior Publication Data

US 2014/0196297 A1  Jul. 17, 2014

(30) Foreign Application Priority Data

Jan. 11, 2013 (TW) .................................. 102200641

(51) Int. Cl.
*G01B 5/02* (2006.01)
*G01B 5/08* (2006.01)
*G01B 5/00* (2006.01)

(52) U.S. Cl.
CPC .................................. *G01B 5/0009* (2013.01)

(58) Field of Classification Search
CPC ........ G01B 5/0009; G01B 5/252; G01B 5/02; G01B 5/025; G01B 5/08; G01B 5/20
USPC .......... 33/550, 783, 792, 803, 804, 805, 810, 33/811
See application file for complete search history.

(56) References Cited

U.S. PATENT DOCUMENTS

| | | | | |
|---|---|---|---|---|
| 4,485,704 A | * | 12/1984 | Gardner | 82/153 |
| 5,533,271 A | * | 7/1996 | Callaghan, Jr. | 33/502 |
| 2009/0151182 A1 | * | 6/2009 | Chang et al. | 33/551 |
| 2010/0269362 A1 | * | 10/2010 | Bos | 33/503 |
| 2014/0373648 A1 | * | 12/2014 | Stambuk Cvitanovic et al. | 73/865.8 |
| 2015/0000147 A1 | * | 1/2015 | Chang et al. | 33/503 |

* cited by examiner

*Primary Examiner* — G. Bradley Bennett
(74) *Attorney, Agent, or Firm* — Rosenberg, Klein & Lee

(57) ABSTRACT

A detecting gauge with high accuracy mainly comprises a machine table, a detecting set, a clamping apparatus, a detecting apparatus, and a sliding apparatus. Particularly, the sliding apparatus includes a sliding rail disposed on a machine table and a sliding base slidably disposed on said sliding rail. A sliding groove is disposed on both sides of the sliding rail, an embedding portion is formed on the sliding base for matching the sliding groove, and a plurality of rollers are embedded on a surface of said embedding portion which is in contact with said sliding groove. By matching the embedding portion with the sliding groove, the sliding base can be slid and moved precisely and smoothly on the sliding rail, and a target to be detected can be stably held by the clamping apparatus, whereby the detecting apparatus can obtain the measurement with high accuracy.

10 Claims, 13 Drawing Sheets

DETECTING GAUGE WITH HIGH ACCURACY

BACKGROUND OF THE INVENTION

1. Field of the Invention

The present invention relates to a detecting gauge, particularly to a detecting gauge with high accuracy.

2. Description of the Related Art

To ensure the quality of the following production, a procedure of detecting the pre-produced specifications must to be executed before a mass production of targets to be detected, such as screws, nuts, and nails. Generally, the targets are detected by a detecting gauge like a curvature instrument, a length instrument, and a concentric instrument.

Referring to FIG. 1, a conventional detecting gauge 1 comprises a machine table 11 and a detecting set 12 disposed on the machine table 11; wherein the detecting gauge 1 is mainly used to detect a target 2 with a short length. The detecting set 12 includes a clamping apparatus 13 disposed on the machine table 11 and capable of clamping a target 2, a detecting apparatus 14 corresponding to the clamping apparatus 13, and a sliding apparatus 15 disposed on the machine table 11. The sliding apparatus 15 includes two parallel sliding shafts 151 disposed on the machine table 11 and a sliding base 152 penetrated by the sliding shafts 151 and capable of being slidably moved on the sliding shafts 151. The detecting apparatus 14 is disposed on a top of the sliding base 152. While detecting, after the target 2 is clamped by the clamping apparatus 13, the detecting apparatus 14 can be moved to a preferable detecting position by moving the sliding base 152 for measuring the specification of the target 2.

However, because the sliding base 152 is penetrated by the sliding shafts 151, the removable sliding base 152 completely contacts the sliding shafts 151 while using the conventional detecting gauge 1 to detect the target 2. Therefore, the resistance between the sliding base 152 and the sliding shafts 151 increases, which causes the sliding smoothness of the sliding base 152 to be lowered and generates the wear of the sliding base 152 and the sliding shafts 151. Consequently, the gap between the sliding base 152 and the sliding shafts 151 is gradually broadened, and the detecting apparatus 14 is relatively affected and apt to sway, thereby lowering the accuracy of data measured by the detecting apparatus 14 and causing the detected data to become imprecise.

Consulting FIG. 2, usually, a target 2 with a longer length is detected by another conventional detecting gauge 1 which still comprises a machine table 11, a detecting set 12, a clamping apparatus 13, a detecting apparatus 14, and a sliding apparatus 15. The detailed components are the same as the previous prior art and herein are omitted. Particularly, this conventional gauge 1 further includes a supporting apparatus 16 disposed on the sliding apparatus 15. The supporting apparatus 16 provides a supporting base 161 disposed on the sliding base 152 and two supporting members 162 juxtaposed on the supporting base 161. Each supporting member 162 includes an axle 1621 projected out of the supporting base 161 and a bearing 1622 sleeved on the axle 1621. While detecting, one end of the target 2 is placed on the clamping apparatus 13 for being pressed by the clamping apparatus 13, and the other end of the target 2 is placed between the bearings 1622 for being measured by the detecting apparatus 14.

However, after using, the conventional detecting gauge 1 still has drawbacks as follows:

1. Generally, a plurality of rollers P shown in FIG. 3 are disposed inside the bearing 1622 of each supporting member 162, and a space S filled with lubricant (not shown) is usually retained in the interior of the bearing 1622 in advance for allowing the rollers P to rotate in the bearing 1622. However, while one end of the target 2 is placed on the bearings 1622 and the other end thereof is pressed by the clamping apparatus 13, the existence of the space S is apt to cause the deviation of the bearings 1622 by the weight of the target 2 itself and the pressing force of the clamping apparatus 13. Under the rotation of the bearings 1622, the target 2 will be deviated or inclined toward different direction by following the rotation. Therefore, the detected data measured by the detecting apparatus 14 becomes imprecise, and then the operator is apt to misjudge the detected data; that is, the operator sitting in judgment on whether the processing data of the target 2 is qualified is affected, which is however adverse to the following mass production.

2. Tolerance exists in most bearings 1622 while manufacturing, consequently, the factors that the bearing 1622 may still be loosely sleeved on the axle 1621 and the space S is retained in the interior of the bearing 1622 could have the adverse influence on the accuracy of measurement of the detecting apparatus 14.

3. Since the target 2 provides one end thereof merely griped by the clamping apparatus 13 and the other end thereof placed on the bearings 1622 by its weight, the longer the length of the target 2 is obtained, the easier the target 2 is affected by an exterior force or the rotation of the detecting procedure and deviated from the supporting apparatus 16 (as dotted line shown in FIG. 4). As a result, the detecting apparatus 14 cannot get the precise detected data of the target 2.

SUMMARY OF THE INVENTION

The purpose of the present invention is to provide a detecting gauge with high accuracy which allows the detecting apparatus to move precisely and smoothly and allows the target to be stably positioned for obtaining an exact detection, thereby facilitating the following process and mass production.

Accordingly, the detecting gauge with high accuracy in accordance with the present invention comprises a machine table and a detecting set disposed on the machine table, wherein the detecting set includes a clamping apparatus disposed on the machine table and capable of clamping a target to be detected, a detecting apparatus for measuring the target, and a sliding apparatus disposed on the machine table. The sliding apparatus includes a sliding rail disposed on the machine table and a sliding base slidably disposed on the sliding rail. A sliding groove is respectively formed on both sides of the sliding rail, an embedding portion is formed on the sliding base for fitting with the sliding groove, and a plurality of rollers are embedded on a surface of the embedding portion which is in contact with the sliding groove. Accordingly, the sliding base can be stably slid and moved on the sliding rail by matching the embedding portion with the sliding groove, and the target is firmly positioned during the rotating procedure of the detection by the clamping apparatus and the supporting apparatus. Therefore, no matter the detecting apparatus is disposed on the sliding base to detect a shorter target, or a supporting unit is preferably disposed on the sliding base to detect a longer target, the present invention can promote the measuring accuracy of the detecting apparatus by the concatenation of subject correlated elements.

Preferably, detecting apparatus is disposed on the sliding base.

Preferably, the supporting apparatus is disposed on the sliding base, and the supporting apparatus includes a supporting base disposed on the sliding base and two supporting members pivotally juxtaposed on the supporting base, whereby the target is fitly placed across a middle of the axles and a middle of the supporting members.

Preferably, each supporting member is an integrally-formed axle.

Preferably, the positioning unit presses down on a middle of the target.

Preferably, the positioning rail is disposed on the machine table and adjacent to the sliding rail, the positioning unit is capable of sliding on the sliding rail.

Preferably, the positioning unit includes a base, a lever disposed on the base, and a spring disposed between one end of the lever and the base; at least one positioning member is pivotally disposed at one end of the lever for keeping the target in position.

Preferably, the clamping apparatus has two positioning units which respectively hold both ends of the target down.

Preferably, the positioning units are respectively disposed on the body and the supporting base.

The advantages of the present invention over the known prior arts are more apparent to those of ordinary skilled in the art upon reading following descriptions in junction with the drawings.

DETAILED DESCRIPTION OF THE PREFERRED EMBODIMENTS

Figure 1:
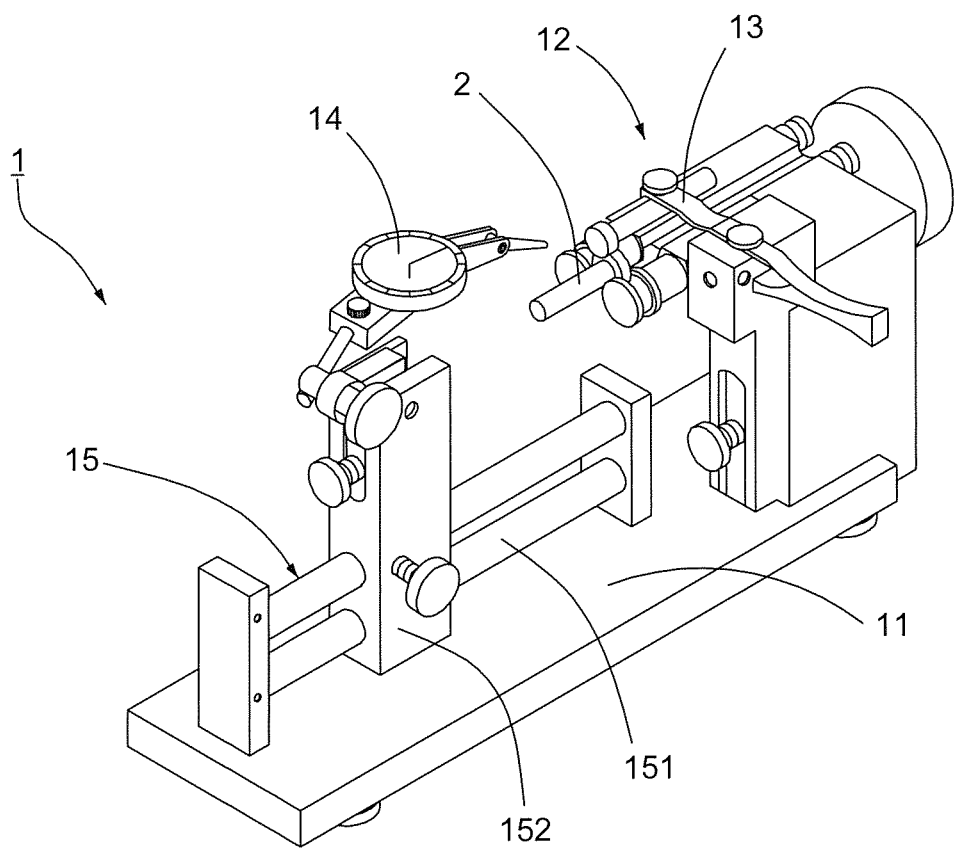
FIG. 1 is a perspective view showing a conventional detecting gauge.
Figure 2:
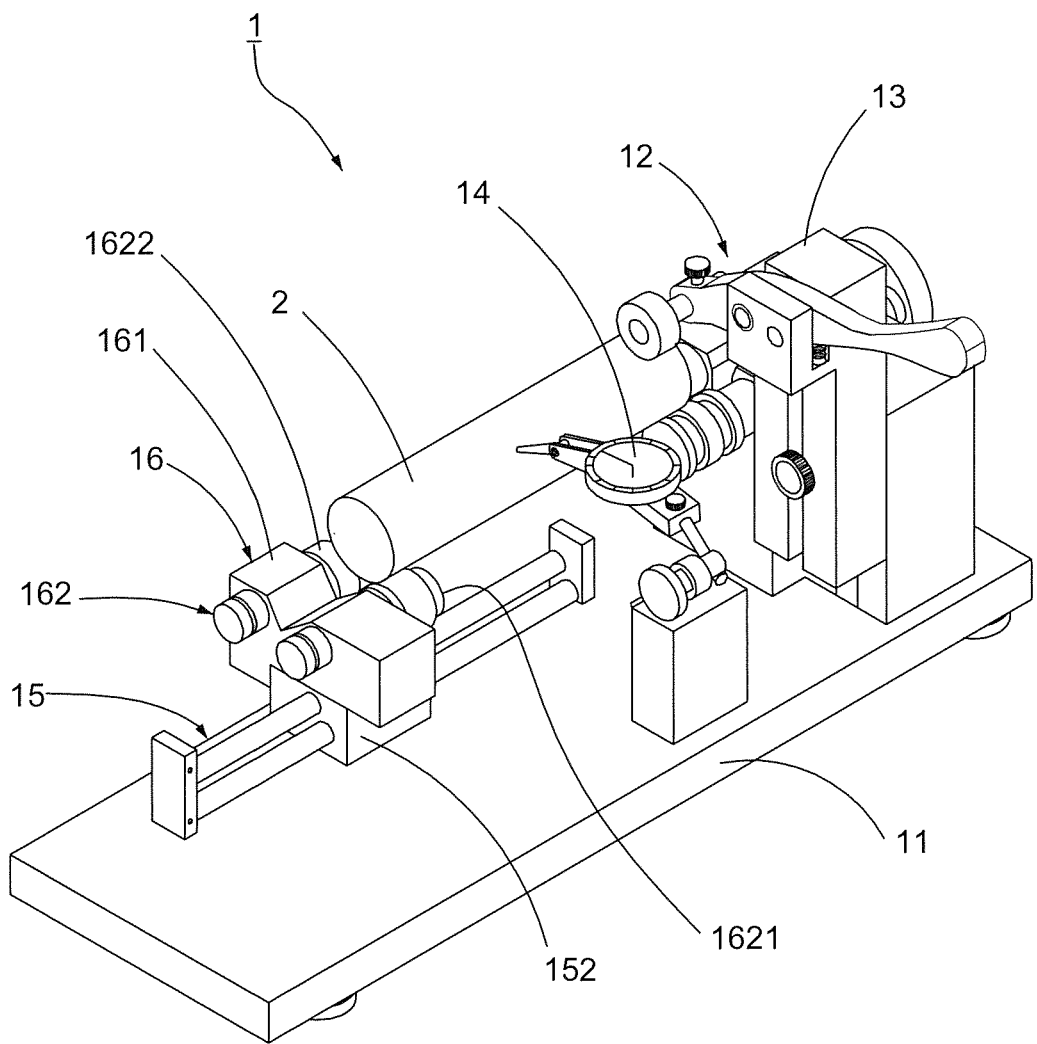
FIG. 2 is a perspective view showing a further conventional detecting gauge.
Figure 3:
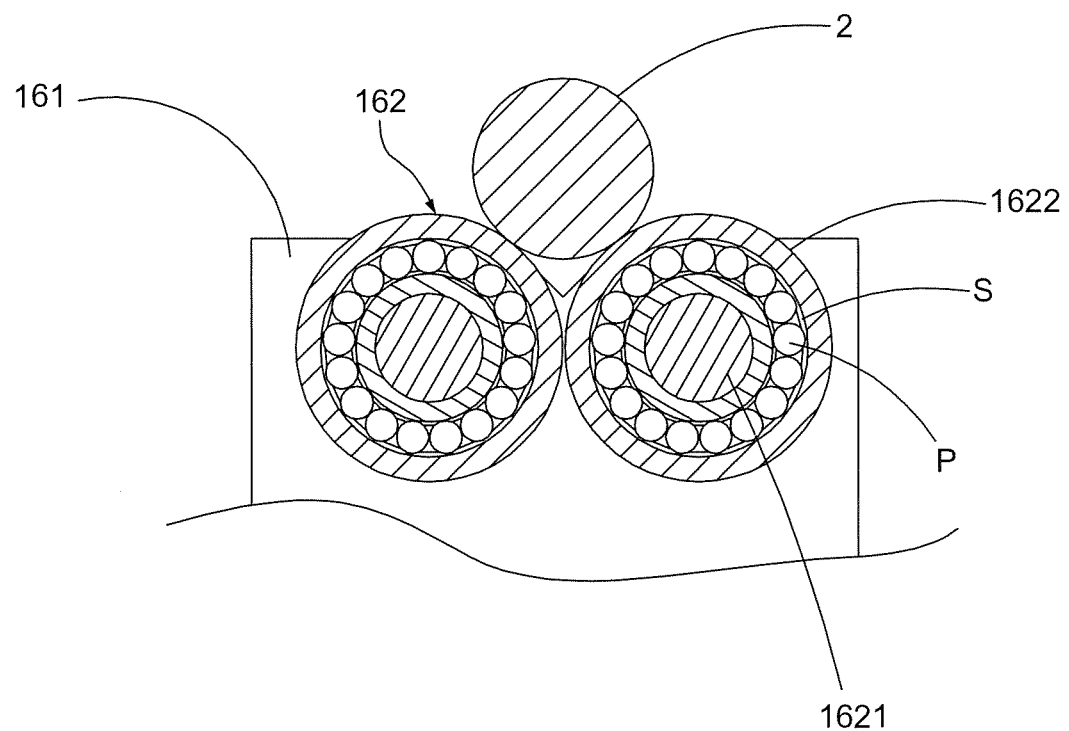
FIG. 3 is a cross-sectional view showing a supporting apparatus of FIG. 2.
Figure 4:
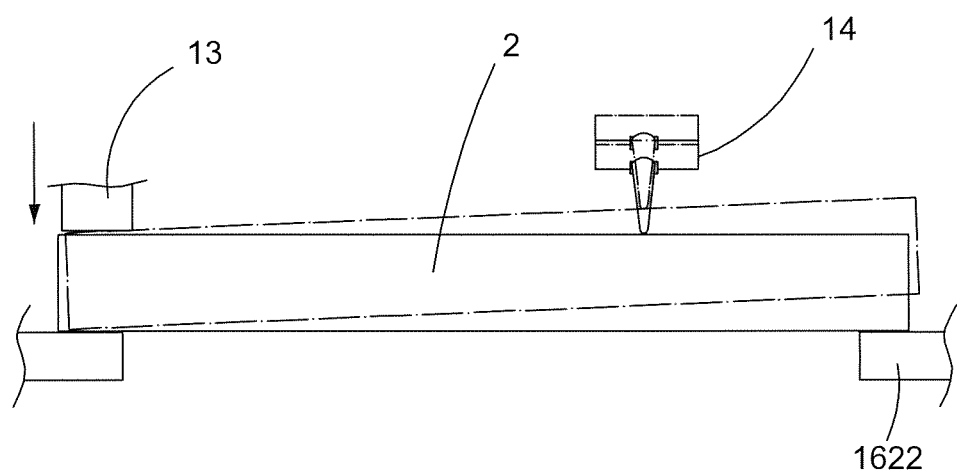
FIG. 4 is a schematic view showing a clamping apparatus of FIG. 2 in use.
Figure 5:
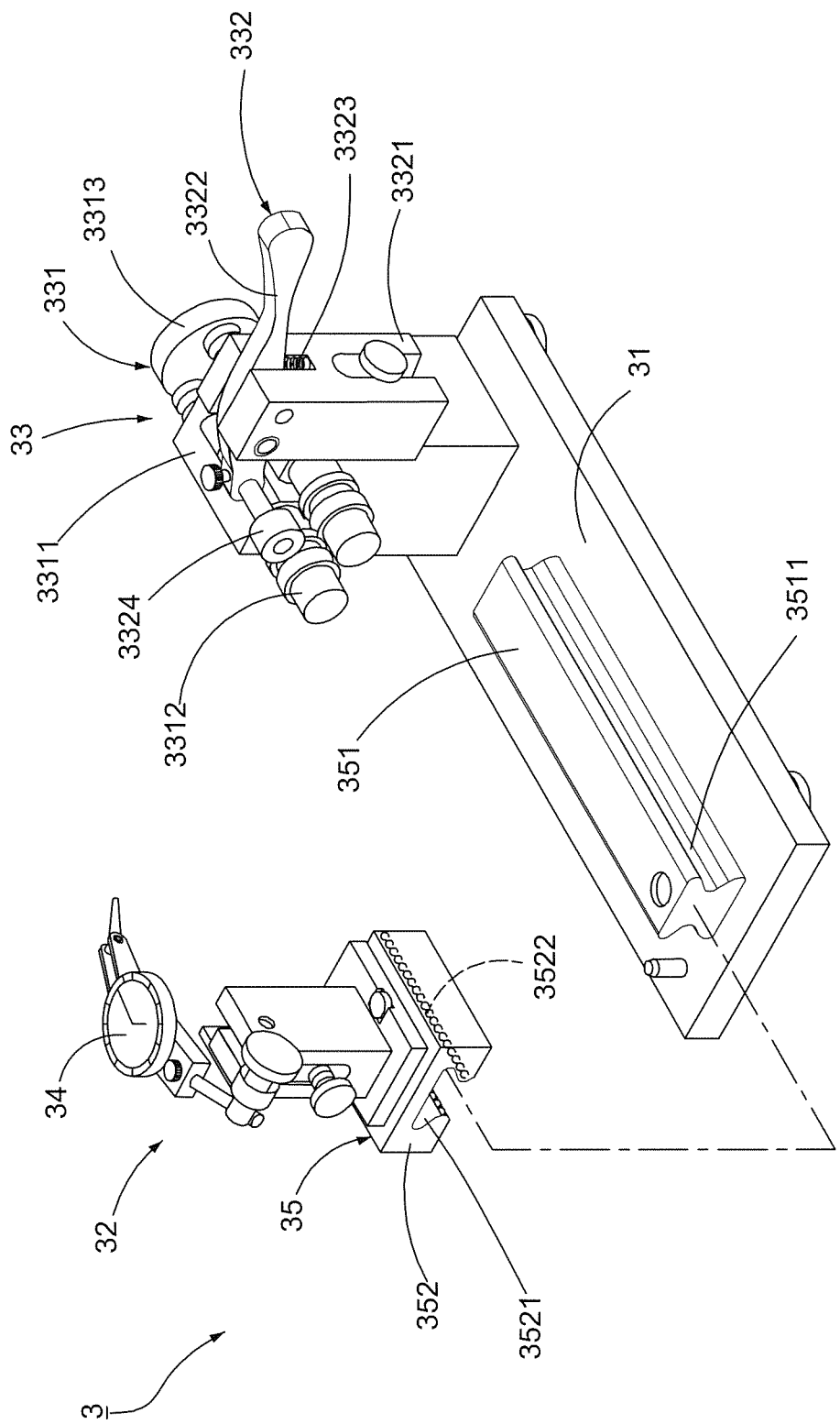
FIG. 5 is a perspective view showing a first preferred embodiment of the present invention.
Figure 6:
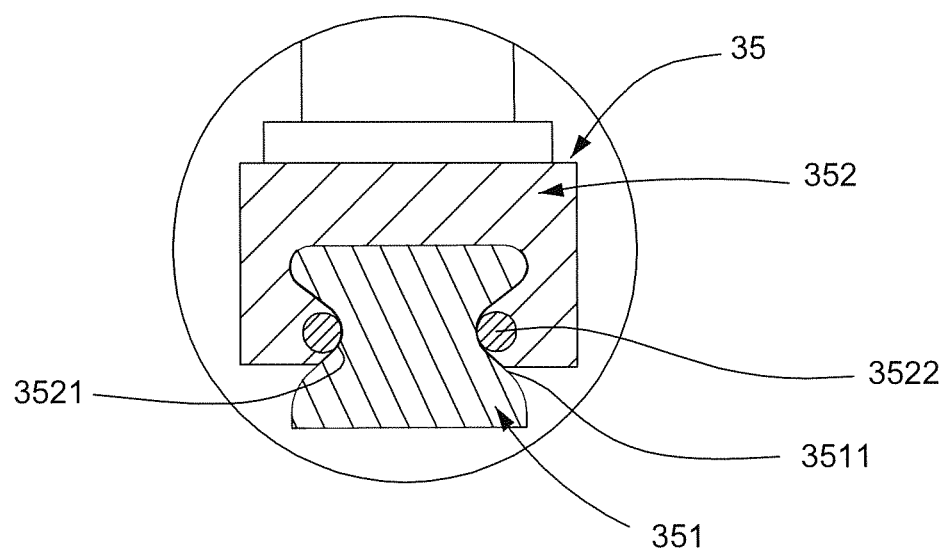
FIG. 6 is a partial cross-sectional view showing the first preferred embodiment of the present invention.

Referring to FIG. 5 and FIG. 6, a first preferred embodiment of the detecting gauge with high accuracy 3 comprises a machine table 31 and a detecting set 32 disposed on the machine table 31, wherein the detecting set 32 includes a clamping apparatus 33 disposed on the machine table 31 and capable of clamping a target to be detected 4, a detecting apparatus 34 for measuring the target 4, and a sliding apparatus 35 disposed on the machine table 31. The clamping apparatus 33 includes a driving unit 331 disposed on the machine table 31 and at least one positioning unit 332 capable of keeping the target 4 in position. The driving unit 331 includes a body 3311 fixedly disposed on the machine table 31, two axles 3312 juxtaposed and penetrating the body 3311, and a transmission member 3313 for driving the rotation of the axles 3312. The positioning unit 332 includes a base 3321, a lever 3322 disposed on the base 3321, a spring 3323 disposed between one end of the lever 3322 and the base 3321, and a positioning member 3324 pivotally disposed at one end of the lever 3322 for keeping the target 4 in position. The sliding apparatus 35 includes a sliding rail 351 disposed on the machine table 31 and a sliding base 352 slidably moved on the sliding rail 351. A sliding groove 3511 is respectively formed on both sides of the sliding rail 351, an embedding portion 3521 is formed on the sliding base 352 for fitting with the sliding groove 3511, and a plurality of rollers 3522 are embedded on a surface of the embedding portion 3521 which is in contact with the sliding groove 3511. The position of the detecting apparatus 34 can be adjusted in accordance with the size of the target 4. In this preferred embodiment, the detecting apparatus 34 is preferably disposed on the sliding base 352 to detect a target 4 with a short length.

Figure 7:
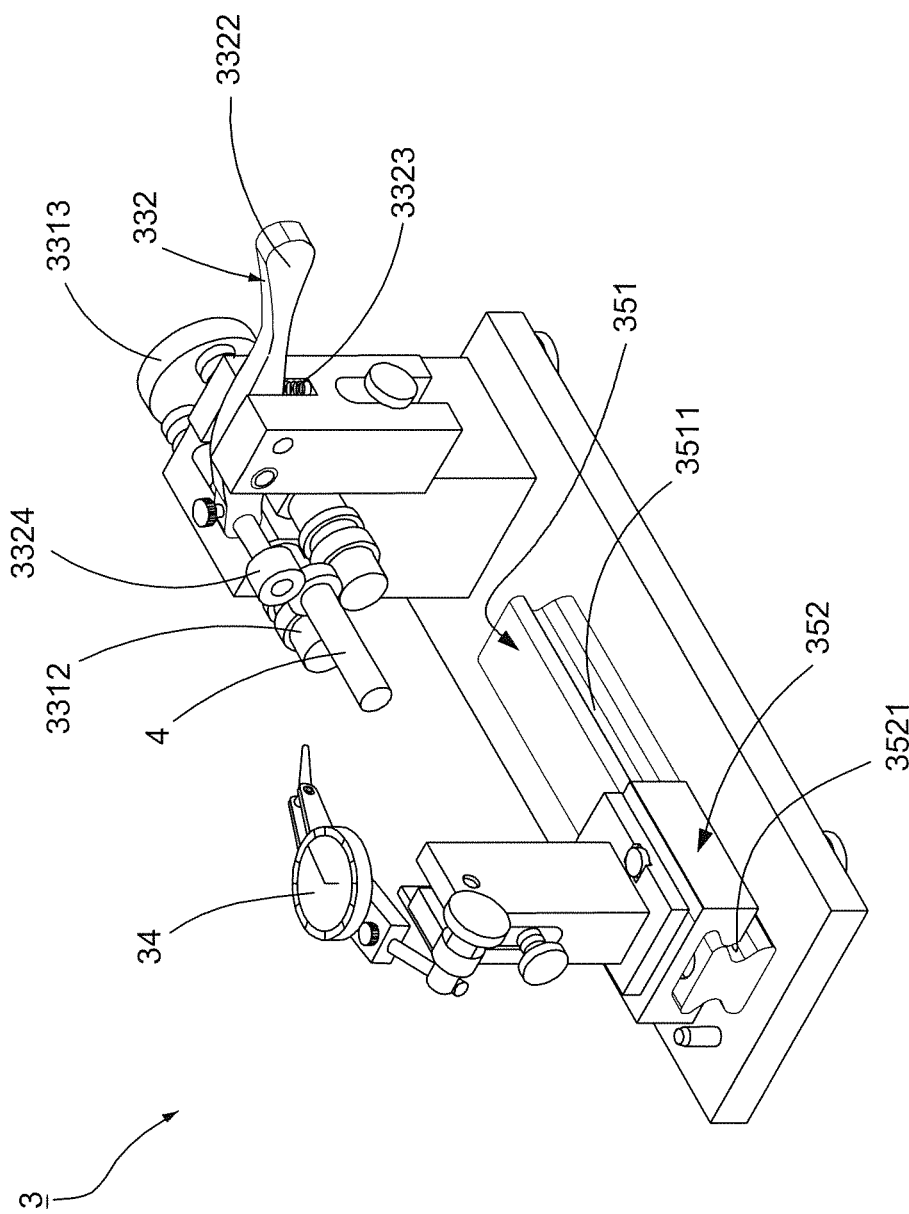
FIG. 7 is a perspective view showing the first preferred embodiment of the present invention in use.

Referring to FIG. 5 to FIG. 7, while the target 4 is detected by the detecting gauge 3, firstly the target 4 is placed on the axles 3312. The lever 3322 is then propelled by the spring force of the spring 3323 for allowing the positioning member 3324 (e.g. a wheel shape) of the positioning unit 332 to firmly press the target 4 down between the axles 3312. Further, the sliding base 352 sliding on the sliding rail 351 moves the detecting apparatus 34 to a preferable detecting position simultaneously, and then the transmission member 3313 drives the rotation of the rotating axles 3312 to rotate the target 4, whereby the detecting apparatus 34 can start the detection. During the sliding procedure, the embedding portions 3521 fitting with the sliding grooves 3511 provide a stable and even supporting force to the sliding base 352 to allow the sliding base 352 to be stably moved without swaying. Therefore, the detecting apparatus 34 disposed on the sliding base 352 can obtain a precise measurement. The rollers 3522 embedded on the surface of the embedding portion 3521 which is in contact with the sliding grooves 3511 not only decrease the friction of the movement of the sliding base 352 against the sliding rail 351 but also prevent the problem of the enlarged gap and the wear between the sliding base 352 and the sliding rail 351, thereby maintaining the preferable detecting accuracy of the detecting gauge 3.

Figure 8:
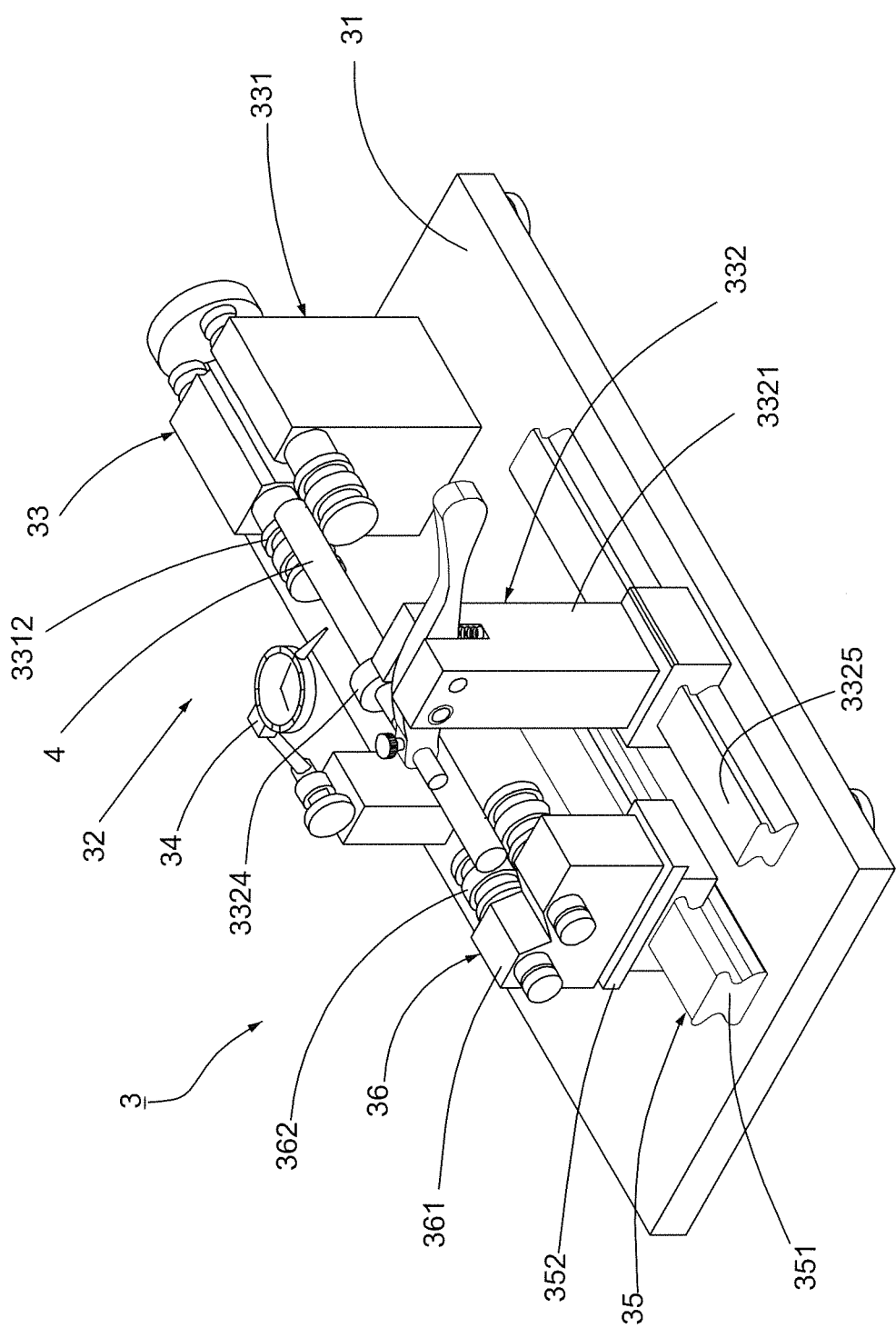
FIG. 8 is a perspective view showing a second preferred embodiment of the present invention.

Referring to FIG. 8, a second preferred embodiment of the detecting gauge 3 still comprises a machine table 31, a detecting set 32, a clamping apparatus 33, a detecting apparatus 34, and a sliding apparatus 35. The detailed components and the functions thereof are the same as the first embodiment and herein are omitted. Particularly, a supporting apparatus 36 is disposed on the sliding base 352 of the sliding apparatus 35. The supporting apparatus 36 includes a supporting base 361 disposed on the sliding base 352 and two supporting members 362 pivotally juxtaposed on the supporting base 361. The target 4 can be fitly placed across a middle of the axles 3312 and a middle of the supporting members 362. The detecting apparatus 34 can be disposed on one side of the machine table 31, and the position of the positioning unit 332 can be adjusted in accordance with the demand of use. For example, the base 3321 of the positioning unit 332 can be directly fixed on the driving unit 331 of the clamping apparatus 33, or the base 3321 can be directly disposed on the machine table 31, or a positioning rail 3325 is further disposed on the machine table 31 and adjacent to the sliding rail 351 (as shown in the figure), so that the positioning unit 332 can be slidably disposed on the positioning rail 3325. Namely, the bottom of the base 3321 of the positioning unit 332 can be a sliding base fitting with the positioning rail 3325 in order that the base 3321 can be slidably disposed on the positioning rail 3325, and the position where the positioning member 3324 of the positioning unit 332 presses down on the target 4 can be adjusted. In this embodiment, it is adopted that the positioning unit 332 is slidably disposed on the positioning rail 3325.

Figure 9:
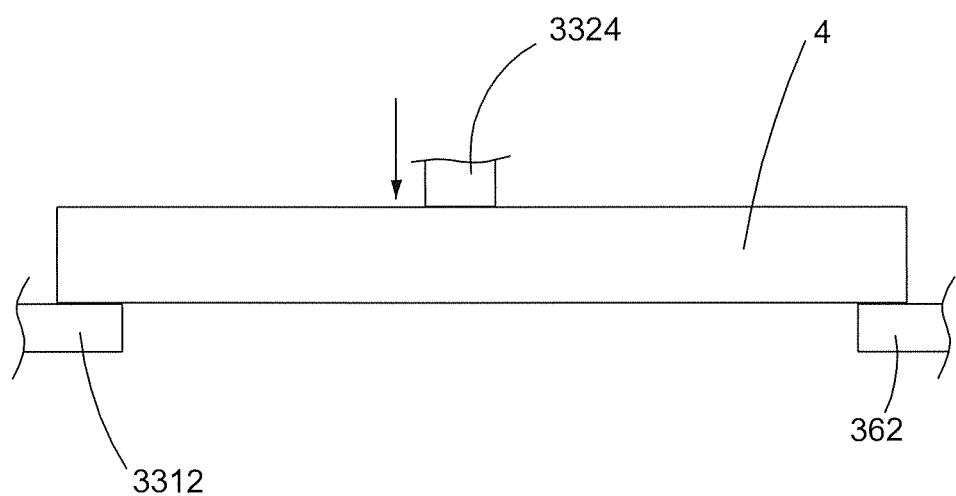
FIG. 9 is a schematic view showing the second preferred embodiment of the present invention in use.

Still referring to FIG. 8, while detecting, the position of the sliding base 352 moving on the sliding rail 351 is adjusted in accordance with the length of the target 4 for controlling the distance between the axles 3312 and the supporting members 362. The target 4 can be placed across the middle of the axles 3312 and the middle of the supporting members 362. Then, the positioning unit 332 can be moved to where the user wants to hold the target 4 by slidably moving the base 3321 on the sliding rail 3325. Herein, the preferable position of the positioning unit 332 to press and keep the target 4 in position is in the middle of the target 4 as shown in FIG. 9, whereby the pressing force is evenly distributed at two ends of the target 4 and forms three supporting points. In other words, a contact point between the positioning member 3324 and the target 4 and two respective points where two ends of the target 4 contacts the axles 3312 and the supporting members 362. Therefore, the target 4 can be stably placed across the driving unit 331 and the supporting apparatus 36 for being detected by the detecting apparatus 34, whereby the problem of raising one end of the prior target 2 or making the deviation of the target 4 due to the sway or the rotation during the detection can be prevented, and a detection procedure with the stable supporting and high accurate measurement can be preferably obtained.

Figure 10:
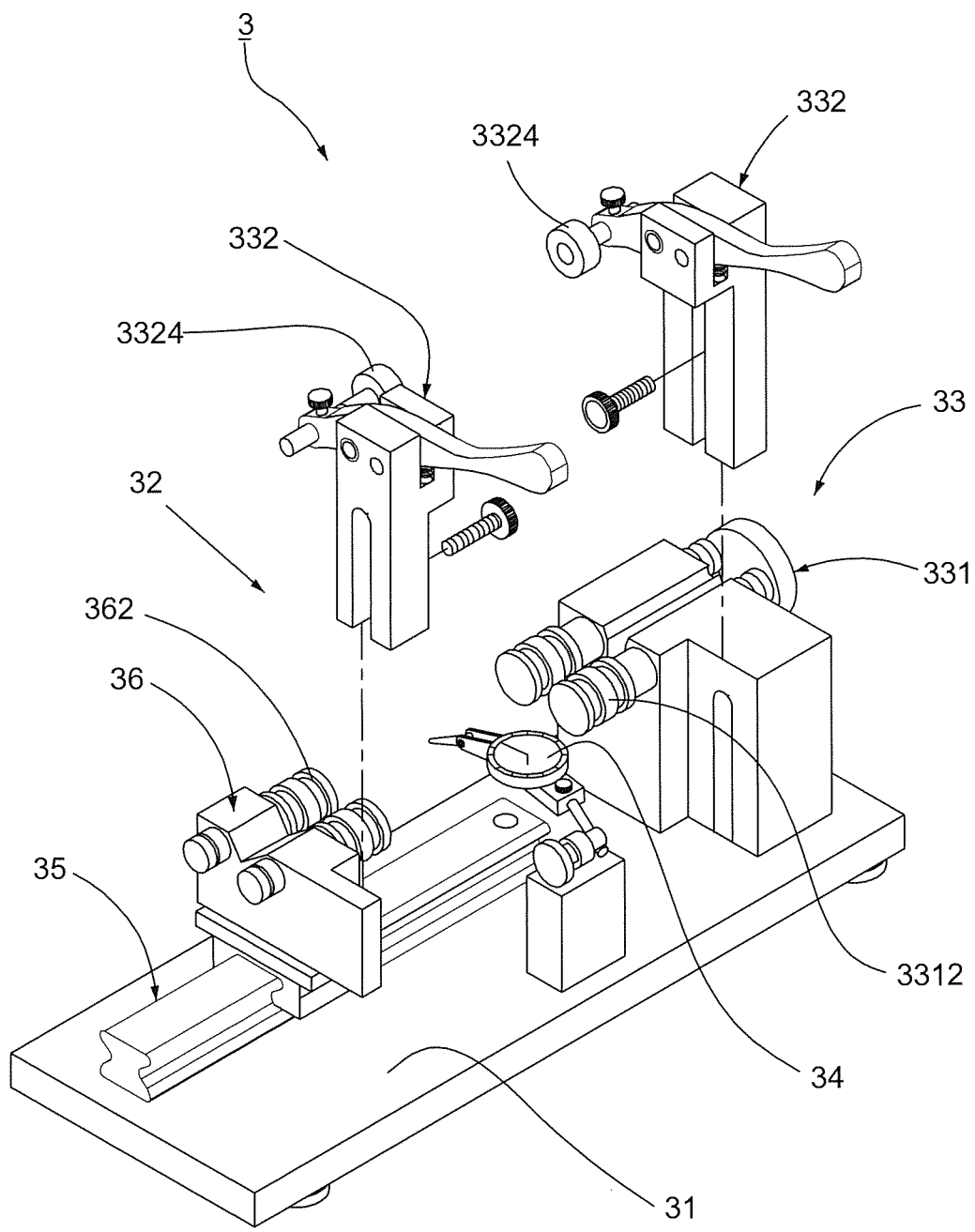
FIG. 10 is a perspective view showing a third preferred embodiment of the present invention.
Figure 11:
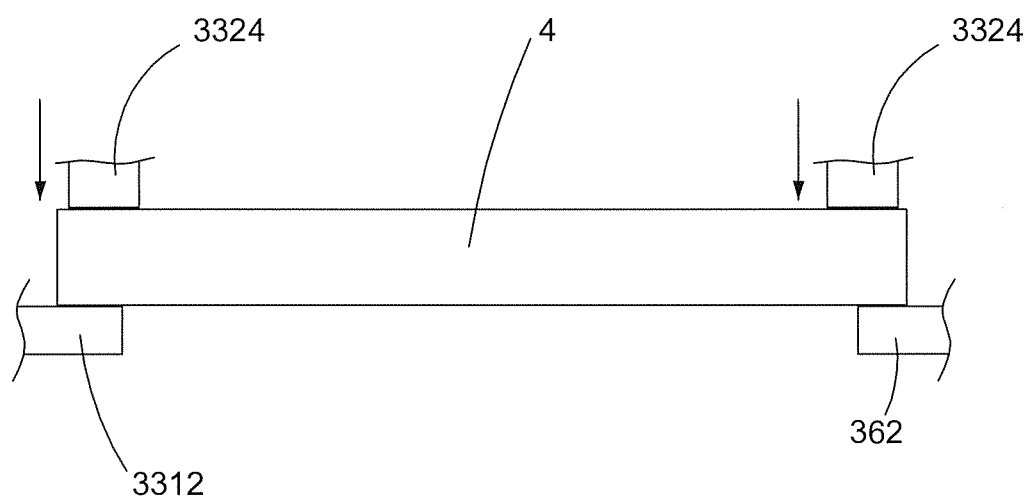
FIG. 11 is a schematic view showing the third preferred embodiment of the present invention in use.

Consulting FIG. 10, a third preferred embodiment of the detecting gauge 3 still comprises the same components as the second embodiment, which are herein omitted. Particularly, the detecting gauge 3 has two positioning units 332 which are respectively disposed on the driving unit 331 and the supporting apparatus 36. Namely, the positioning members 3324 of the positioning units 332 are respectively placed on the axles 3312 and the supporting members 362 for replacing the slidable positioning unit of the second embodiment. As a result, while the target 4 is placed across the driving unit 331 and the supporting apparatus 36, both ends of the target 4 can be respectively and stably held on the axles 3312 of the driving unit 331 and the supporting members 362 of the supporting apparatus 36 by the positioning members 3324 (as shown in FIG. 11). Therefore, the deviation of the target 4 caused by moving or swaying during the detecting procedure is prevented, and the detecting apparatus 34 can precisely execute the measurement to obtain a high detecting accuracy.

Figure 12:
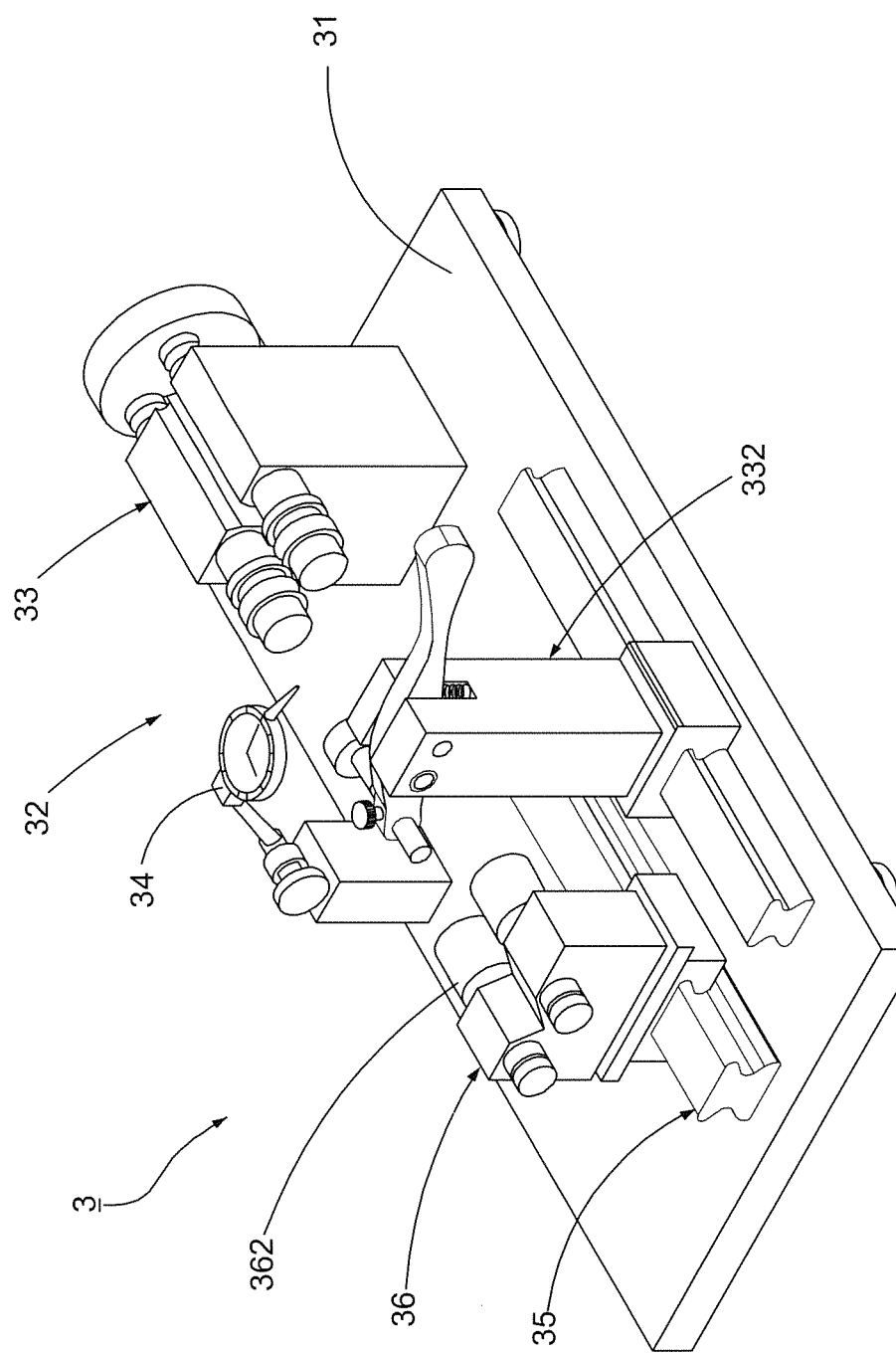
FIG. 12 is a perspective view showing a fourth preferred embodiment of the present invention.
Figure 13:
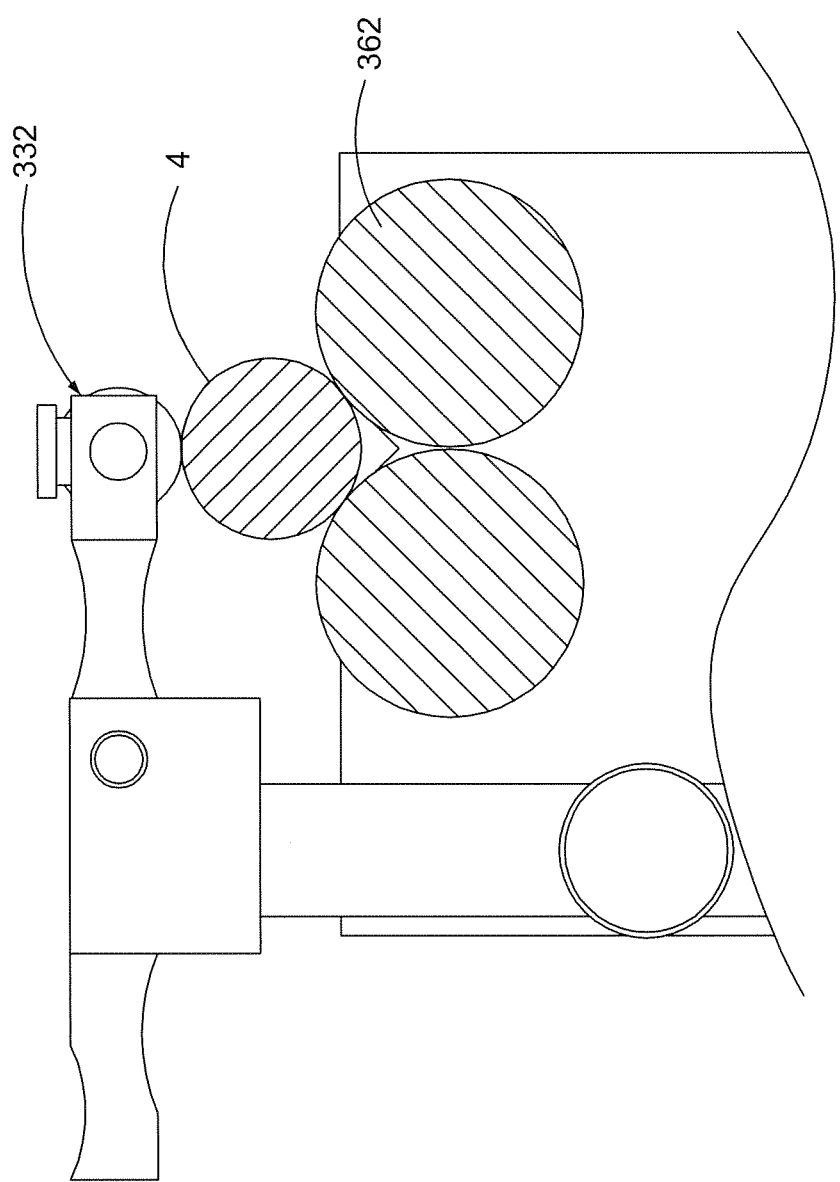
FIG. 13 is a cross-sectional view showing the fourth preferred embodiment of the present invention in use.

Referring to FIG. 12 and FIG. 13, a forth preferred embodiment of the present invention still comprises the same components as the second embodiment and herein are omitted. Particularly, each supporting member 362 of the supporting apparatus 36 is an integrally-formed axle and does not need to be sleeved by any bearing. Therefore, the supporting members 362 will not have the existence of the space inside the bearing as disclosed in the conventional configuration. In this embodiment, the target 4 can be stably placed on the supporting members 362, and the deviation of the bearing caused by the press of the positioning apparatus 332 or the weight of the target 4 itself is prevented for making sure that the target 4 can be rotated without inclining or deviating, whereby the detecting apparatus 34 can exactly detect the specification of the target 4 to facilitate the following process and mass production.

To sum up, the detecting gauge with high accuracy mainly uses the sliding rail and the sliding base to obtain a stable movement. A sliding groove is disposed on both sides of the sliding rail, an embedding portion is formed on the sliding base for fitting with the sliding groove, and a plurality of rollers are embedded on the embedding portion. Consequently, the sliding base can be stably slid on the sliding rail by matching the rollers of the embedding portion with the sliding groove, and the cooperation of the clamping apparatus and the supporting apparatus stably keeps the target in position for promoting the detecting accuracy of the detecting apparatus, thereby obtaining the correct measurement from the detecting gauge.

While we have shown and described the embodiment in accordance with the present invention, it should be clear to those skilled in the art that further embodiments may be made without departing from the scope of the present invention.

What is claimed is:

1. A detecting gauge with high accuracy comprising a machine table and a detecting set disposed on said machine table; said detecting set including a clamping apparatus disposed on said machine table and capable of clamping a target to be detected, a detecting apparatus for measuring said target, and a sliding apparatus disposed on said machine table; wherein said clamping apparatus including a driving unit disposed on said machine table and at least one positioning unit capable of keeping said target in position; said driving unit including a body fixedly disposed on said machine table, two axles juxtaposed and penetrating said body, and a transmission member for driving a rotation of said axles; said sliding apparatus including a sliding rail disposed on said machine table and a sliding base slidably disposed on said sliding rail; a sliding groove being respectively formed on both sides of said sliding rail, an embedding portion being formed on said sliding base for fitting with said sliding groove, and a plurality of rollers being embedded on a surface of said embedding portion which is in contact with said sliding groove.

2. The detecting gauge with high accuracy as claimed in claim 1, wherein said detecting apparatus is disposed on said sliding base.

3. The detecting gauge with high accuracy as claimed in claim 1, wherein a supporting apparatus is disposed on said sliding base, and said supporting apparatus includes a supporting base disposed on said sliding base and two supporting members pivotally juxtaposed on said supporting base, whereby said target is fitly placed across a middle of said axles and a middle of said supporting members.

4. The detecting gauge with high accuracy as claimed in claim 3, wherein each supporting member is an integrally-formed axle.

5. The detecting gauge with high accuracy as claimed in claim 3, said positioning unit presses down on a middle of said target.

6. The detecting gauge with high accuracy as claimed in claim 3, wherein a positioning rail is disposed on said machine table and adjacent to said sliding rail, said positioning unit being capable of sliding on said sliding rail.

7. The detecting gauge with high accuracy as claimed in claim 2, wherein said positioning unit includes a base, a lever disposed on said base, and a spring disposed between one end of said lever and said base; at least one positioning member being pivotally disposed at one end of said lever for keeping said target in position.

8. The detecting gauge with high accuracy as claimed in claim 3, wherein said positioning unit includes a base, a lever disposed on said base, and a spring disposed between one end of said lever and said base; at least one positioning member being pivotally disposed at one end of said lever for keeping said target in position.

9. The detecting gauge with high accuracy as claimed in claim 3, wherein said clamping apparatus has two positioning units which respectively hold both ends of said target down.

10. The detecting gauge with high accuracy as claimed in claim 8, wherein said positioning units are respectively disposed on said body and said supporting base.

* * * * *